United States Patent [19]
Le Bar, Jr.

[11] 3,757,809
[45] Sept. 11, 1973

[54] LINEAR GOVERNOR

[75] Inventor: Philip A. Le Bar, Jr., Belleville, Mich.

[73] Assignee: General Motors Corporation, Detroit, Mich.

[22] Filed: Nov. 22, 1971

[21] Appl. No.: 200,871

[52] U.S. Cl.............. 137/47, 91/433, 91/458, 91/461, 137/85
[51] Int. Cl. ............................................ G05d 13/40
[58] Field of Search.................... 137/47, 58, 85; 91/388, 433, 458, 461; 415/43; 417/42

[56] References Cited
UNITED STATES PATENTS

| | | | |
|---|---|---|---|
| 3,258,025 | 6/1966 | Howland | 137/85 |
| 1,814,631 | 7/1931 | Ray | 137/47 |
| 3,110,321 | 11/1963 | Broad | 137/85 X |
| 3,555,969 | 1/1971 | Shah | 91/461 |
| 2,015,861 | 10/1935 | Mitereff | 415/43 |

Primary Examiner—Robert G. Nilson
Attorney—W. E. Finken et al.

[57] ABSTRACT

This disclosure relates to a hydraulic governor which includes fixed displacement pump means for providing a fluid flow proportionate to the speed it is driven. The hydraulic governor also includes flow control valve means for controlling the communication of the fixed displacement pump means with an exhaust and which has variable orifice means for varying the restriction of the fluid flow. The hydraulic governor further includes pressure regulator valve means which is in fluid communication with the pump means and which is responsive to variations of the fluid flow pressure from a predetermined value for regulating the pressure of a control fluid as a substantially linear function of the speed of the pump drive. The pressure regulator valve means is in fluid communication with the flow control valve means for the variable orifice means to vary the restriction of the fluid flow in response to variations in the control fluid pressure to correct the fluid flow pressure to the predetermined value.

5 Claims, 6 Drawing Figures

PATENTED SEP 11 1973
3,757,809
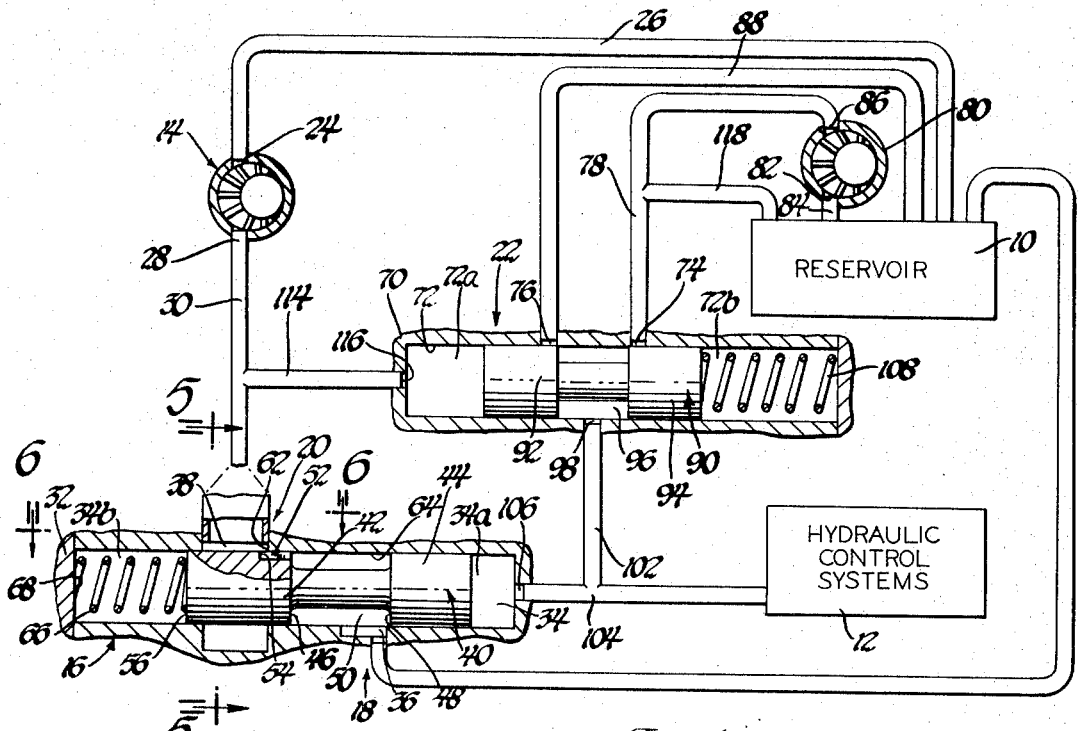
Fig.1
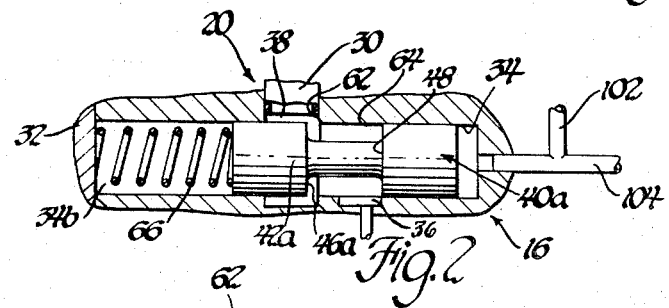
Fig.2
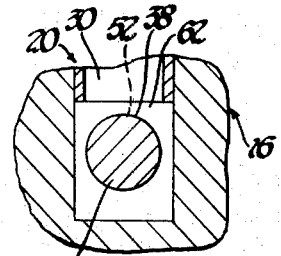
Fig.5
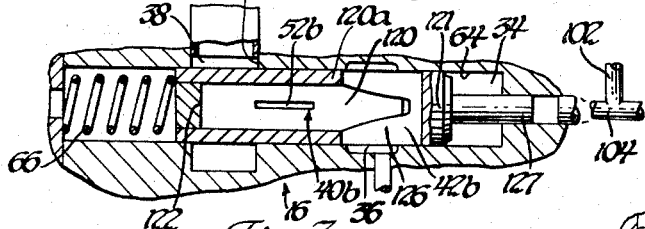
Fig.3
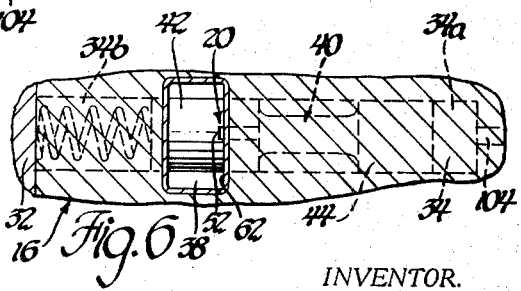
Fig.6
Fig.4
INVENTOR.
Philip A. LeBar, Jr.
BY
W. A. Schuetz
ATTORNEY

LINEAR GOVERNOR

The present invention relates to a hydraulic governor, and more particularly to a hydraulic governor for regulating the pressure of a control fluid as a substantially linear function of the speed of a drive means.

Hydraulic governors have heretofore been provided in various hydraulic circuits or mechanisms to provide a fluid signal pressure related in magnitude to the speed of a drive means for the purpose of establishing various automatic control functions. In automotive vehicles, hydraulic governors have been incorporated within the fluid pressure automatic control circuits of transmissions and anti-wheel lock mechanisms for the purpose of providing a fluid signal pressure that is related in magnitude to the speed of the output shaft of the transmission and thereby providing a fluid signal pressure that is related in magnitude to the speed of the rear wheels of the vehicle.

It has been found that the use of a hydraulic governor which produces a signal pressure as a non-linear function of the output speed of a drive means in a control system does not lend itself for use where precise control in direct proportion to speed is desired or required throughout an operating range. More particularly, where the sensitivity of a hydraulic governor, meaning changes in the magnitude of the governor pressure in relation to changes in the output speed, is relatively high or low in localized areas within an overall operating range of a control system, the signal pressure generated for that localized area may not be precise enough for certain applications. Therefore, it can be desirable in such control systems to employ a hydraulic governor which provides a signal pressure as a linear function of an output speed in order to increase the precision of the performance of the control system throughout its operating range.

An object of the present invention is to provide a new and improved hydraulic governor for regulating the pressure of a control fluid as a substantially linear function of speed and which comprises fixed displacement pump means which provides a fluid flow proportionate to the speed of the pump input, flow control valve means for controlling communication between the pump means and an exhaust and which has variable orifice means for varying the restriction of the fluid flow, and pressure regulator valve means which is in fluid communication with the pump means and responsive to variations in the fluid flow pressure from a predetermined value to regulate the pressure of a control fluid as a substantially linear function of the speed of the pump input, and where the pressure regulator valve means is in fluid communication with the flow control valve means for the variable orifice means to vary the restriction of the fluid flow in response to variations in the control fluid pressure to correct the fluid flow pressure to its predetermined value.

Another object of the present invention is to provide a new and improved hydraulic governor, as defined in the preceding object, in which the variable orifice for restricting the fluid flow and controlling communication of the fluid flow with the exhaust is defined by the inward facing end of one spool of a double spool valve element which is slidably supported within a bore of the flow control valve and the inlet port of the flow control valve.

Another object of the present invention is to provide a new and improved hydraulic governor, as defined in the first object, in which the variable orifice for restricting the fluid flow and for controlling the communication of the fluid flow with the exhaust is defined by an axially extending slot or groove in one spool of a double spool valve element which is slidably supported within the bore of the flow control valve and the inlet port of the flow control valve.

Another object of the present invention is to provide a new and improved hydraulic governor, as defined in the first object, in which the variable orifice for restricting the fluid flow and for controlling the communication of the fluid flow with the exhaust is defined by a narrow, elongated slot in a valve element slidably supported within the bore of the flow control valve and which is in communication with an inner chamber of the valve element and the inlet port of the flow control valve.

These and other objects of the present invention are accomplished in one embodiment having fixed displacement pump means in communication with a fluid supply and adapted to be driven by a variable speed drive means for providing a fluid flow proportionate to the speed of the drive means, a flow control valve means for controlling communication between the pump means and an exhaust and wherein the flow control valve means has an inlet port and an exhaust port with a valve member means defining a variable orifice with the inlet port for restricting the fluid flow, and pressure regulator valve means which is in fluid communication with the pump means for regulating the pressure of a control fluid as a substantially linear function of the speed of the drive means. The pressure regulator valve means has a first port in fluid communication with a high fluid pressure source, a second port in fluid communication with a low fluid pressure source, and a third port for communicating the control fluid to the flow control valve means. Further, the pressure regulator valve means has valve member means responsive to the fluid flow pressure for communicating the high fluid pressure source with the control fluid to increase the control fluid pressure when the rate of the fluid flow is increasing and the fluid flow pressure increases above a predetermined value and for communicating the low fluid pressure source with the control fluid to decrease the control fluid pressure when the rate of the fluid flow is decreasing and the fluid flow decreases to below the predetermined value. The valve member means blocks fluid communication of the high and low fluid pressure sources with the control fluid to maintain the control fluid pressure constant when the rate of the fluid flow is constant and the fluid flow pressure is equal to the predetermined value. The third port of the pressure regulator valve means is in fluid communication with the valve member means of the flow control valve means for the valve member means to decrease the restriction of the fluid flow in response to increases in the control fluid pressure and to increase the restriction of the fluid flow in response to decreases in the control fluid pressure to thereby correct the fluid flow pressure to the predetermined value.

These and other objects of the invention will become more fully apparent from the following description and drawings wherein:

FIG. 1 is a schematic view of a hydraulic system embodying the hydraulic governor of the present invention;

FIG. 2 is a fragmentary view of a second embodiment of the hydraulic governor of the present invention;

FIG. 3 is a fragmentary view of a third embodiment of the hydraulic governor of the present invention;

FIG. 4 is an elevational view of a part of the hydraulic governor shown in FIG. 3;

FIG. 5 is a cross-sectional view taken approximately along line 5—5 in FIG. 1; and FIG. 6 is a cross-sectional view taken approximately along line 6—6 in FIG. 1.

As representing one embodiment of the present invention, the drawings show the hydraulic governor in fluid communication with a fluid supply or reservoir 10 and a hydraulic control system 12, such as an automotive vehicle transmission or an automotive vehicle antiwheel lock device.

The hydraulic governor broadly comprises a fixed displacement pump 14 for providing a fluid flow proportionate to the speed of the pump input, a flow control valve means 16 for controlling communication between the pump means and an exhaust 18 and which has a variable orifice means 20 for varying the restriction of the fluid flow, and a pressure regulator valve means 22 which is in fluid communication with the pump means 14 and which is responsive to variations in the fluid flow pressure from a predetermined value for regulating the pressure of a control fluid as a substantially linear function of the speed of the pump input. The pressure regulator valve means 22 is also in fluid communication with the flow control valve means 16 for the variable orifice means 20 to vary the restriction of the fluid flow in response to variations in the control fluid pressure to correct the fluid flow pressure to its predetermined value.

Referring to FIG. 1, the fixed displacement pump means 14 is herein shown as a vane type pump, but can be of any suitable or conventional variety, and is driven by any suitable variable speed drive means (not shown), such as the output shaft of the transmission of an automotive vehicle. The pump 14 has an inlet 24 in fluid communication with the fluid reservoir 10 via a line or conduit 26 in order to draw a fluid, such as oil, from the fluid reservoir 10 into the body of the pump means 14 by suction. The fixed displacement pump means 14 discharges a fluid flow proportionate to the speed of its drive means, by virtue of its fixed displacement characteristic, via an outlet 28 and into a line 30.

The flow control valve means 16, which controls communication between the outlet 28 of the pump means 14 and the exhaust 18 back to the fluid reservoir 10, comprises a valve body 32 with a cylindrical bore 34 therein and having an exhaust port 36 and an inlet port 38 which are axially spaced along the bore 34. The inlet port 38 of the flow control valve means 16 is in fluid communication with the outlet 28 of the pump means 14 via the line 30 and thereby receives the fluid flow from the pump means 14. The inlet port 38 is a rectangular opening in the valve body 32, as shown in FIG. 6, and has a width greater than the diameter of the bore 34. Now referring to FIG. 5, the inlet port 38 extends completely through the bore 34 and, by reason of its width, thereby provides for communication of the fluid flow with the bore 34 at all points about the periphery of the bore 34. The flow control valve means 16 further comprises a double spool valve element 40 which is slidably received within the bore 34 of the valve body 32 for movement therein and which divides the bore 34 into right and left end chambers 34a and 34b, as viewed in FIG. 1.

The valve element 40 has first and second spaced lands or spools 42 and 44, respectively, whose inward facing sides 46 and 48 define a fluid flow passage or annular recess 50 therebetween for communicating the inlet port 38 and the exhaust port 36 when the valve element 40 is in certain positions within the bore 34, as will later be described. The first spool 42 of the valve element 40 has a relatively narrow, elongated groove or slot 52 therein which extends axially from the inward facing side 46, and is thereby in fluid communication with the fluid flow passage 50, and terminates in an end wall 54 located between the inward facing side 46 and an outward facing side 56 of the spool 42. The slot 52 is a rectangularly shaped opening in the outer periphery of the first spool 42, as viewed in cross section. The slot 52 defines with the juncture between the wall 62 of the inlet port 38 and the wall 64 of the bore 34 a rectangularly shaped variable orifice means 20 for restricting the fluid flow through the flow control valve means 16 and provides a substantially complete pressure drop thereacross. It should be understood that the axial position of the valve member 40 is purely determinative of the size of the variable orifice means 20, and, because the inlet port 38 communicates the fluid flow to all parts about the periphery of the bore 34, the relative angular relationship which the valve member 40 and its slot 52 may assume with the bore 34 is irrelevant as the fluid flow will be communicated to the slot 52. The valve element 40 is biased to a closed position in which the land 42 blocks communication between the inlet port 38 and the slot 52 when the fluid flow is zero by a biasing means 66. The biasing means comprises a compression spring 66 located within the bore 34 and having one end in abutting engagement with the left end 68 of the valve body 32 and its other end in abutting engagement with the left end 56 of the first spool 42.

The pressure regulator valve means 22, which regulates the pressure of a control fluid as a substantially linear function of the speed of the drive means of the pump 14, comprises a valve body 70 having a cylindrical bore 72 therein with first and second axially spaced ports 74 and 76. The first port 74 is in fluid communication via line 78 with any suitable high pressure source which would provide a relatively constant fluid pressure, herein shown as a vane type pump 80 which could be driven by the input shaft of the transmission of an automotive vehicle. The pump 80 has an inlet 82 in fluid communication via line 84 with a fluid reservoir 10 and an outlet 86. The second port 76 is in fluid communication via a line 88 with any suitable low pressure source, herein shown as the fluid reservoir 10.

The pressure regulator valve means 22 further includes a dual spool valve element 90 having first and second spools or lands 92 and 94 spaced apart a distance substantially equal to the axial spacing of the first and second ports 74 and 76 and which define an annular passage or recess 96 therebetween. The valve body 72 also has a third port 98 which is axially positioned halfway between the first and second ports 74 and 76 and which is in fluid communication with the chamber 34a of the bore 34 of the flow control valve means 16 via interconnected lines 102 and 104 and port 106 and with the hydraulic control system 12 via lines 102 and 104. The third port 98 is also in fluid communication with the hydraulic control system 12 via the interconnected lines 102 and 104. The valve element 90 is slidably supported within the bore 72 and divides the bore into left and right chambers 72a and 72b, as viewed in FIG. 1.

The valve element is biased leftward by a biasing means, herein shown as a compression spring 108, located within chamber 72b and having one end in abutting engagement with the second spool 94 and its other end in abutting engagement with the right end of the valve body 70. In its normal position the land 92 blocks communication between the second port 76 and the third port 98 while the land 94 blocks communication between the first port 74 and the third port 98.

The fluid flow from the pump means 14 is in communication with the chamber 72a of the bore 72 via a line 114 interconnected with the line 30 and a port 116 in the left end of the valve body 70 to thereby act upon the first spool 92 to bias the valve element 90 in a rightward direction opposite the first direction to bias the compression spring 108. By virtue of the communication of the pressure regulator valve means 22 with the high and low fluid pressure sources, it should be understood that a control fluid pressure is provided within the lines 102 and 104 to serve as a signal pressure for the hydraulic control system 12, and that the pressure regulator valve means 22 varies or regulates the control fluid pressure between high and low pressure limits as established by the pressures of the high and low pressure sources by blocking or unblocking communication between the high and low fluid pressures and the lines 102 and 104 in response to variations in the fluid flow pressure.

A bypass line 118 is interconnected with the line 78 between the first port 74 of the pressure regulator valve means 22 and the high pressure source 80 to bypass fluid flow from the high pressure source 80 back to the fluid reservoir 10 when the first port 74 is blocked by the second spool 94 of the valve element 90.

With reference to the aforementioned detailed description, the operation of the hydraulic governor of the present invention will now be described. When the pump means 14 is not being driven and no fluid flow is provided in the line 30, the compression spring 66 biases the valve element 40 to a right hand position in which the land 42 blocks communication between the inlet port 38 and the slot 52 and the variable orifice 20 is thereby closed. Also, the compression spring 108 biases the valve element 90 to a left hand position within the bore 72 of the valve body 70 to completely unblock the second port 76 and communicate the low fluid pressure source with the annular passage 96 while blocking the first port 74 and communication of the high fluid pressure source with annular passage 96 with the second spool 94. Therefore, the pressure of the control fluid in lines 102 and 104 is equivalent to the pressure of the low fluid pressure source.

When the drive means is actuated and the pump means 14 is driven at a constant speed in a low speed range of speeds, such as when the vehicle is moving at low speed, the fluid flow provided by the pump means does not at first pass through the inlet 38 into the flow control valve means 16 because the variable orifice 20 is closed. Therefore, the fluid flow pressure increases and, by virtue of the communication therebetween, the fluid flow pressure shifts the valve element 90 of the pressure regulator valve means 22 against the bias of spring 108 to gradually block the second port 76 with the first spool 92 and to gradually unblock the high fluid pressure source by unblocking the first port 74. As the high fluid pressure source is gradually unblocked, the control fluid pressure in lines 102 and 104 is caused to gradually increase. As the pressure of the control fluid is increased, the valve element 40 is shifted within the bore of the flow control valve 16 to open the variable orifice means 20 by virtue of the communication between the valve element 40 and the control fluid pressure. The variable orifice 20 is thereby gradually opened to reduce the restriction of the fluid flow and provide for communication of the fluid flow from the inlet 38, through the fluid flow passage 50, and to the exhaust port 36, and the fluid flow pressure is gradually reduced. The gradual reduction of the fluid flow pressure allows the spring 108 to shift the valve element 90 leftward to gradually block the first port 74 and the high fluid pressure source with the second spool 94. Eventually, the fluid flow pressure is reduced to a predetermined pressure where the bias of the spring 108 and the fluid flow pressure positions the valve element 90 as shown in FIG. 1 where the first port 74 is blocked by the second spool 94 and the second port 74 is blocked by the first spool 92. When both the high and low fluid pressure sources are blocked the control fluid pressure obviously stabilizes, and consequently, the valve element 40 is not further shifted and the size of the variable orifice 20 remains constant. Under such conditions, the hydraulic governor is in a state of equilibrium with the fluid flow pressure constant at a predetermined pressure and the control fluid pressure at some constant pressure and remains so until the speed of the drive means increases.

When the speed of the drive means of the pump means 14 is increasing from the low speed range of speeds, the rate of the fluid flow produced by the pump means 14 is similarly increasing, and the fluid flow pressure gradually increases because the fluid flow is restricted by the variable orifice 20. The gradual increase in the fluid flow pressure serves to shift the valve element 90 of the pressure regulator valve means 22 to cause the second spool 94 to unblock the high fluid pressure source by gradually unblocking the first port 74, which in turn causes the control fluid pressure to gradually increase. As the control fluid pressure increases, it serves to shift the valve element 40 to the left to gradually increase the opening of the variable orifice 20 to lessen the restriction of the fluid flow. So long as the fluid flow rate is increasing, the fluid flow pressure remains above its predetermined value and the high fluid pressure source remains unblocked. Therefore, the pressure of the control fluid is continually increasing and the opening of the variable orifice 20 is continually increased in response thereto to reduce the restriction of the fluid flow. However, reduction of the restriction of the fluid flow does not reduce the fluid flow pressure to its predetermined value so long as the rate of fluid flow is also increasing.

When the speed of the drive means stops increasing, however, the rate of fluid flow produced by the pump means 14 stabilizes, and the pressure of the fluid flow from the pump means 14 will be reduced toward its predetermined value. When the fluid flow pressure again reaches its predetermined value, the valve element 90 of the pressure regulator valve means 22 is shifted by the spring 108 so that the spools 94 and 92 block the first and second ports 74 and 76 to block communication between high and low fluid pressure sources and the annular passage 96. When the ports 74 and 76 are blocked, the hydraulic governor has reached a state of equilibrium where the control fluid pressure is maintained at a constant value proportional to the speed of the drive means, the opening of the variable orifice 20 is constant because of the constant control fluid pressure in lines 102 and 104, and the fluid flow pressure is constant at its predetermined value because the fluid flow rate and the opening of the variable orifice 20 are constant.

When the speed of the drive means of the pump means 14 is decreasing from the high value it attained, the fluid flow pressure decreases to below its predetermined value because the fluid flow decreases and the opening of the variable orifice means 20 is constant. The decrease in the fluid flow pressure allows the bias of the spring means 108 to shift the valve element 90 of the pressure regulator valve means 22 to gradually unblock the low fluid pressure source by unblocking the second port 76 with the first spool 92, and the control fluid pressure is thereby caused to gradually decrease. The decrease in the pressure of the control fluid allows the bias of the spring 66 to shift the valve element 40 of the flow control valve means 16 to gradually close the opening of the variable orifice means 20 to further restrict the fluid flow. So long as the fluid flow rate is decreasing, the fluid flow pressure remains below its predetermined value and the low fluid pressure source is maintained in communication with the annular passage 96 which provides for the control fluid pressure to constantly decrease. As the pressure of the control fluid is continually being lowered, the size of the opening of the variable orifice means 20 is being constantly decreased, but reducing the opening of the variable orifice means 20 to further restrict the fluid flow does not increase the fluid flow pressure to its predetermined value so long as the fluid flow rate continues to decrease. Once the fluid flow rate stabilizes, however, the fluid flow pressure does increase to its predetermined value because the fluid flow is constant and the opening of the variable orifice 20 is decreasing. The increase of the fluid flow pressure serves to shift the valve element 90 of the pressure regulator valve means 22 to block both the high and low fluid pressure sources, and, as previously described, the hydraulic governor attains a state of equilibrium in which the control fluid pressure is stabilized at a fluid pressure proportional to the speed of the drive means.

It should be noted that the magnitude of the control fluid pressure is a function of the magnitude of the flow rate produced by the pump means 14, and that the control fluid pressure is regulated in proportion to the speed of the drive means in response to variations in the fluid flow rate.

Now referring to FIG. 2, another embodiment of the flow control valve means 16 is shown. All aspects of the first embodiment of the flow control valve means 16, shown in FIG. 1, are retained with the exception of the valve element 40. Herein, the valve element 40 is replaced with another double spool element 40a having a first spool 42a which does not have a slot therein such as the slot 52 of the first spool 42 in the first embodiment. Therefore, the variable orifice 20 is in the form of a cylindrical surface and defined between the inward facing end 46a of the spool 42a and the juncture between the wall 62 of the inlet port 38 and the wall 64 of the bore 34.

Now referring to FIGS. 3 and 4, a third embodiment of the flow control means 16 is shown. Again, all aspects of the first embodiment of the flow control valve means 16, shown in FIG. 1, are retained except the valve element 40 is replaced by a different valve element 40b. The valve element 40b has a single spool cylindrical body 42b with a cylindrical inner chamber 120 which has an end wall 121 at one end and a plug 122 forming the other end. The valve element 40b has an elongated, very narrow, rectangularly shaped slot 52b extending through the outer periphery of the valve element body 42b and the wall 120a which defines the inner chamber 120. The variable orifice 20 is now defined by the rectangular slot 52b and the juncture of the wall 62 of the inlet port 38 and the wall 64 of the bore 34. The valve element 40b also includes elongated flow passages 126 which extend on opposite sides of the valve 40b through the outer periphery and the wall 120a of the inner chamber 120 to thereby communicate fluid flow passing from the inlet 38, through the variable orifice 20, and into the inner chamber 120 with the exhaust port 36. The valve element 40b also includes a cylindrical projection 127 which extends from one end of the valve element body 42b into the line 104 to expose a smaller surface for the control fluid to act upon and thereby allow use of a spring 66 having a relatively low spring rate or large displacement characteristic.

The operation of the second and third embodiments of the flow control means 16 within the hydraulic governor is substantially the same as that described in conjunction with the first embodiment.

That hydraulic governor of the present invention produces a control fluid pressure which is substantially a linear function of the speed of a drive means, in contrast to governors which produce a control fluid pressure or signal pressure as a non-linear or exponential function, is shown by the following proof for the first and third embodiments of the present invention:

Drive means speed $= s$
Pump displacement $= D$
Flow rate of pump $= Q = Ds$
Width of variable orifice $= w$
Instantaneous length of variable orifice $= d$
Area of variable orifice $= A = dw$
Control fluid pressure $= P_1$
Fluid flow pressure $= P_2$
Fluid flow through variable orifice means $= Q_1 = CAC_1 \sqrt{\Delta P}$ Where:

$C$ = orifice coefficient
$C_1$ = conversion factor
$\Delta P$ = pressure drop across the variable orifice means
$\Delta P = P_2$ because the pressure drop across the variable orifice is substantially total
$Q_1 = Q$ because all flow from pump is through the variable orifice
$P_2$ = constant because the variable orifice means regulates the fluid flow pressure to a predetermined value
$Q = C(dw) C_1 \sqrt{P_2}$
$C_2 = CC_1 w \sqrt{P_2}$ = a constant conversion factor, and
$Q = C_2 d$
$d = Q/C_2$
$d = Ds/C_2$ Flow control valve spring rate is linear $= k_0$, and
$k_0 d = P_1 A_1$ or $P_1 = k_0 d/A_1$ where $A_1 =$ area of the valve element upon which $P_1$ acts $P_1 = k_0 Ds/C_2 A_1$ and, therefore, the control fluid pressure ($P_1$) is a linear function of the speed ($s$) of the drive means because $k_0$, $D$, $C_2$ and $A_1$ are constants For the second embodiment:
Displacement of the variable orifice means $= d$
Diameter of the variable orifice means $= X$
Drive means speed $= s$
Area of the variable orifice means $= A = \pi X d$
Flow rate of pump $= Q$
Fluid flow through the variable orifice means $= Q_1 = C A \sqrt{2g \Delta h}$ Where, $C =$ variable orifice means coefficient
$g =$ gravitational acceleration
$\Delta h =$ pressure head across said variable orifice means $= C_1 P_2$
$A_1 =$ area of the valve element upon which $P_1$ acts
$P_1 =$ control fluid pressure
$k =$ flow control valve spring rate which is linear
$P_1 A_1 = kd\ d = A/\pi X$
$P_1 = kd/A_1$ where
$P_1 = kA/A_1 \pi X$
$A = Q_1/C \sqrt{2g \Delta h}$
$P_1 = k Q_1/A_1 \pi X C \sqrt{2g \Delta h}$
$Q_1 = Q = Ds$
$P_1 = kDs/A_1 \pi X C \sqrt{2g \Delta h}$ Therefore the control fluid pressure ($P_1$) is linear function of the speed ($s$) of the drive means because $k$, $D$, $A_1$, $\pi$, $X$, $C$, $g$ and $\Delta h$ are constants.

The foregoing disclosure relates to only one embodiment of the invention which may be modified within the scope of the appended claims.

What is claimed is:

1. A hydraulic governor comprising: fixed displacement pump means for providing a fluid flow proportionate to the speed of the pump input; pressure regulator valve means in fluid communication with said pump means and directly responsive to variations in the fluid flow pressure from a predetermined value for regulating the pressure of a control fluid as a substantially linear function of the speed of said input; flow control valve means for controlling communication of said pump means with an exhaust, said flow control valve means having variable orifice means for varying the restriction of said fluid flow, said flow control valve means being in fluid communication with said pressure regulator valve means, and said variable orifice means of said flow control valve means varying the restriction of said fluid flow only in response to variations in the control fluid pressure to correct said fluid flow pressure to said predetermined value.

2. A hydraulic governor for regulating the pressure of a control fluid as a substantially linear function of speed, comprising: fixed displacement pump means in communication with a fluid supply and adapted to be driven by a variable speed drive means for providing a fluid flow proportionate to the speed of said drive means; pressure regulator valve means in fluid communication with said pump means for regulating the pressure of a control fluid as a substantially linear function of the speed of said drive means directly in response to variations in the fluid flow pressure, said pressure regulator valve means having a first port in fluid communication with a high fluid pressure source and a second port in fluid communication with a low fluid pressure source and a third port, said pressure regulator valve means having second valve member means responsive to the fluid flow pressure for unblocking said high fluid pressure source to increase the control fluid pressure when the rate of said fluid flow is increasing and said fluid flow pressure increases above a predetermined value, said second valve member means also for unblocking said low fluid pressure source to decrease said control fluid pressure when said rate of said fluid flow is decreasing and said fluid flow pressure decreases to below said predetermined value, said second valve member means also for blocking said high and low fluid pressure sources to maintain said control fluid pressure constant when said rate of said fluid flow is constant and said fluid flow pressure is equal to said predetermined value; flow control valve means for controlling communication between said pump means and an exhaust, said flow control valve means having an inlet port and an exhaust port, said flow control valve means having first valve member means defining a variable orifice with said inlet port for restricting said fluid flow, said first valve member means of said flow control valve means being in fluid communication with said third port of said pressure regulator valve means, said first valve member means to decrease the restriction of said fluid flow only in response to increases in said control fluid pressure and to increase the restriction of said fluid flow only in response to decreases in said control fluid pressure to correct said fluid flow pressure to said predetermined value.

3. A hydraulic governor for regulating the pressure of a control fluid as a substantially linear function of speed comprising: a fixed displacement pump driven by a variable speed drive means and having an inlet and an outlet, said inlet being in communication with a fluid supply, said fixed displacement pump providing a fluid flow through said outlet proportionate to the speed of said drive means; a flow control valve for controlling communication between said pump and an exhaust back to said fluid supply, said flow control valve having a bore with an exhaust port and an inlet port axially spaced from said exhaust port and which is in fluid communication with said outlet port of said pump, said flow control valve having a double spool valve element with the inward facing ends of said spools defining a passage in communication with said exhaust port, the inward facing end of the first of said double spools defining with said inlet port a cylindrically shaped variable orifice for restricting said fluid flow and for controlling communication of said fluid flow with said passage, spring means at one end of said bore acting on the outward facing end of said first spool for biasing said valve member to close said variable orifice when said fluid flow is zero; a pressure regulator valve for regulating the pressure of a control fluid as a substantially linear function of the speed of said drive means, said pressure regulator valve having a bore and having a first port in communication with a high pressure source and a second port axially spaced from said first port in communication with a low pressure source, said pressure regulator valve having a valve member with dual spools spaced apart a distance substantially equal to the axial spacing of said first and second ports to define a passage between said dual spools, said pressure regulator valve having a third port positioned axially between said first and second ports and in communication with said passage, spring means at one end of said bore for biasing said first of said dual spools in a direction tending to communicate said low fluid pressure source with said passage, the other end of said bore being in fluid communication with said outlet of said pump for the fluid flow pressure to act on the second of said dual spools against the bias of said spring means and in a direction tending to communicate said high fluid pressure source with said passage, said fluid flow pressure and the bias of said spring means moving said valve member to block communication of said high fluid pressure source with said passage with said first spool and to block communication of said low fluid pressure source with said passage with said second spool to maintain the pressure of said control fluid constant when the rate of said fluid flow is constant and said fluid flow pressure is equal to a predetermined value, said fluid flow pressure serving to move said valve member against the bias of said spring means to communicate said high fluid pressure source with said passage to increase said control fluid pressure when said rate of said fluid flow is increasing and said fluid flow pressure increases above said predetermined value, the bias of said spring means to move said valve element against said fluid flow pressure to communicate said low fluid pressure source with said passage to decrease said control fluid pressure when said rate of said fluid flow is decreasing and said fluid flow pressure decreases to less than said predetermined value, said third port being in fluid communication with the other end of said bore of said flow control valve for said control fluid pressure to act upon the outward facing end of the second of said double spools in opposition to the bias of said spring means, said control fluid pressure serving to move said valve member against the bias of said spring means to increase said variable orifice in response to increases in said control fluid pressure for reducing the restriction of said fluid flow to correct the fluid flow pressure to a predetermined value, said bias of said spring means to move said valve member against said control fluid pressure to reduce said variable orifice in response to decreases in said control fluid pressure for increasing the restriction of said fluid flow to correct said fluid flow pressure to said predetermined value.

4. A hydraulic governor for regulating the pressure of a control fluid as a substantially linear function of speed comprising: a fixed displacement pump driven by variable speed drive means and having an inlet and an outlet, said inlet being in communication with a fluid supply, said fixed displacement pump providing a fluid flow through said outlet proportionate to the speed of said drive means; a flow control valve for controlling communication between said pump and an exhaust back to said fluid supply, said flow control valve comprising a bore with an exhaust port and an inlet port axially spaced from said exhaust port and which is in fluid communication with said outlet port of said pump, said flow control valve having a double spool valve element with the inward facing ends of said spools defining a passage in communication with said exhaust port, the first of said double spools having a narrow groove thereon which extends from said inward facing end of said first spool and terminates at an end wall between said inward facing end and the outward facing end of said first spool, said end wall of said flat defining with said inlet port a variable control orifice for restricting said fluid flow and for controlling communication of said fluid flow with said passage, spring means at one end of said bore acting on said outward facing end of said first spool for biasing said valve member to close said variable control orifice when said fluid flow is zero; a pressure regulator valve for regulating the pressure of a control fluid as a substantially linear function of the speed of said drive means, said pressure regulator valve comprising a bore and having a first port in communication with a high pressure source and a second port axially spaced from said first port in communication with a low pressure source, said pressure regulator valve having a valve member with dual spools spaced apart a distance substantially equal to the axial spacing of said first and second ports to define a passage between said dual spools, said bore having a third port between said first and second ports and in communication with said passage, spring means at one end of said bore for biasing said first of said dual spools in a direction tending to communicate said low fluid pressure source with said passage, the other end of said bore being in said fluid communication with said outlet of said pump for the fluid flow pressure to act on the second of said dual spools against the bias of said spring means and in a direction tending to communicate said high fluid pressure source with said passage, said fluid flow pressure and the bias of said spring means moving said valve member to block communication of said high fluid pressure source with said passage with said first spool and to block communication of said low fluid pressure source with said passage with said second spool to maintain the pressure of said control fluid constant when the rate of said fluid flow is constant and said fluid flow pressure is equal to a predetermined value, said fluid flow pressure serving to move said valve member against the bias of said spring means to communicate said high fluid pressure source with said passage to increase said control fluid pressure when said rate of said fluid flow is increasing and said fluid flow pressure increases above said predetermined value, the bias of said spring means to move said valve element against said fluid flow pressure to communicate said low fluid pressure source with said passage to decrease said control fluid pressure when said rate of said fluid flow is decreasing and said fluid flow pressure decreases to less than said predetermined value, said third port being in fluid communication with the other end of said bore of said flow control valve for said control fluid pressure to act upon the outward facing end of the second of said double spools in opposition to the bias of said spring means, said control fluid pressure serving to move said valve member against the bias of said spring means to increase said variable control orifice in response to increases in said control fluid pressure for reducing the restriction of said fluid flow to correct the fluid flow pressure to a predetermined value, said bias of said spring means to move said valve member against said control fluid pressure to reduce said variable control orifice in response to decreases in said control fluid pressure for increasing the restriction of said fluid flow to correct said fluid flow pressure to said predetermined value.

5. A hydraulic governor for regulating the pressure of a control fluid as a substantially linear function of speed, comprising: a fixed displacement pump driven by variable speed drive means and having an inlet and an outlet, said inlet being in communication with a fluid supply, said fixed displacement pump providing a fluid flow through said outlet proportionate to the speed of said drive means; a flow control valve for controlling communication between said pump and an exhaust back to said fluid supply, said flow control valve comprising a bore with an exhaust port and an inlet port axially spaced from said exhaust port and which is in fluid communication with said outlet port of said pump, said flow control valve having a valve element with an inner chamber, said valve element having passage means for fluidally communicating said inner chamber with said exhaust port, said valve element having a narrow, axially extending, rectangularly shaped slot from the outer periphery of said valve element to said inner chamber, said slot defining with said inlet port a variable control orifice for restricting said fluid flow and for controlling communication of said fluid flow with said inner chamber, spring means at one end of said bore acting on one end of said valve element for biasing said valve element to close said variable control orifice when said fluid flow is zero; a pressure regulator valve for regulating the pressure of a control fluid as a substantially linear function of the speed of said drive means, said pressure regulator valve comprising a bore and having a first port in communication with a high pressure source and a second port axially spaced from said first port in communication with a low pressure source, said pressure regulator valve having a valve member with dual spools spaced apart a distance substantially equal to the axial spacing of said first and second ports to define a passage between said dual spools, said bore having a third port between said first and second ports and in communication with said passage, spring means at one end of said bore for biasing said first of said dual spools in a direction tending to communicate said low fluid pressure source with said passage, the other end of said bore being in fluid communication with said outlet of said pump for the fluid flow pressure to act on the second of said dual spools against the bias of said spring means and in a direction tending to communicate said high fluid pressure source with said passage, said fluid flow pressure on the bias of said spring means moving said valve member to block communication of said high fluid pressure source with said passage with said first spool and to block communication of said low fluid pressure with said passage with said second spool to maintain the pressure of said control fluid constant when the rate of said fluid flow is constant and said fluid flow pressure is equal to a predetermined value, said fluid flow pressure serving to move said valve member against the bias of said spring means to communicate said high fluid pressure source with said passage to increase said control fluid pressure when said rate of said fluid flow is increasing and said fluid flow pressure increases above said predetermined value, the bias of said spring means to move said valve element against said fluid flow pressure to communicate said low fluid pressure source with said passage to decrease said control fluid pressure when said rate of said fluid flow is decreasing and said fluid flow pressure decreases to less than said predetermined value, said third port being in fluid communication with the other end of said bore of said fluid pressure control valve for said control fluid pressure to act upon the outward facing end of said flow control valve in opposition to the biasing of said spring means, said control fluid pressure serving to move said valve member against the bias of said spring means to increase said variable control orifice in response to increases in said control fluid pressure for reducing the restriction of said fluid flow to correct the fluid flow pressure to a predetermined value, said bias of said spring means to move said valve member against said control fluid pressure to reduce said variable control orifice in response to decreases in said control fluid pressure for increasing the restriction of said fluid flow to correct said fluid flow pressure to said predetermined value.

* * * * *

PO-1050
(5/69)

UNITED STATES PATENT OFFICE
CERTIFICATE OF CORRECTION

Patent No. 3,757,809  Dated September 11, 1973

Inventor(s) Philip A. LeBar, Jr.

It is certified that error appears in the above-identified patent and that said Letters Patent are hereby corrected as shown below:

IN THE CLAIMS:

In Claim 1, column 9, line 42, after "of said" insert -- pump --; in Claim 2, column 10, line 6, delete "for"; in Claim 2, column 10, line 11, delete "for"; in Claim 3, column 11, line 22, delete "to move" insert -- moving --.

Signed and sealed this 2nd day of April 1974.

(SEAL)
Attest:

EDWARD M. FLETCHER, JR.
Attesting Officer

C. MARSHALL DANN
Commissioner of Patents